United States Patent

[11] 3,589,449

| [72] | Inventor | Selden G. Washburn<br>Rural Route, Goodwin, S. Dak. 57238 |
|---|---|---|
| [21] | Appl. No. | 796,535 |
| [22] | Filed | Feb. 4, 1969 |
| [45] | Patented | June 29, 1971 |

[54] PLOW COULTER AND RELEASE MECHANISM
4 Claims, 6 Drawing Figs.

[52] U.S. Cl. .................................................. 172/265,
172/238, 172/710, 280/452
[51] Int. Cl. .................................................. A01b 61/04
[50] Field of Search .......................................... 172/264,
265, 572, 573, 710, 238; 280/452, 455

[56] References Cited
UNITED STATES PATENTS

| 615,210 | 11/1898 | Brown | 172/705 X |
| 3,451,489 | 6/1969 | Sullivan | 172/264 X |

FOREIGN PATENTS

| 635,406 | 1/1962 | Canada | 172/264 |
| 553,666 | 10/1930 | Germany | 172/710 |
| 163,951 | 7/1958 | Sweden | 172/264 |

*Primary Examiner*—Edgar S. Burr
*Attorneys*—Clarence A. O'Brien and Harvey B. Jacobson ABSTRACT: An elevated implement support frame portion having front and rear ends and an upstanding implement support arm depending therefrom and pivotally supported from the frame portion for oscillation about a horizontal axis between a first operative position and a second implement release position with the lower end of the arm swung rearwardly from its operative position. An actuating mechanism including a spring is connected between the support frame and the support arm through a bellcrank and connecting operating rod for urging the support arm toward its operative position. The actuating mechanism has its component parts relatively arranged whereby maximum biasing action of the spring on the support arm occurs when the support arm is in its operative position and the biasing action of the spring on the support arm is substantially reduced as soon as the support arm is slightly angularly displaced from its operative position toward its inoperative or release position.

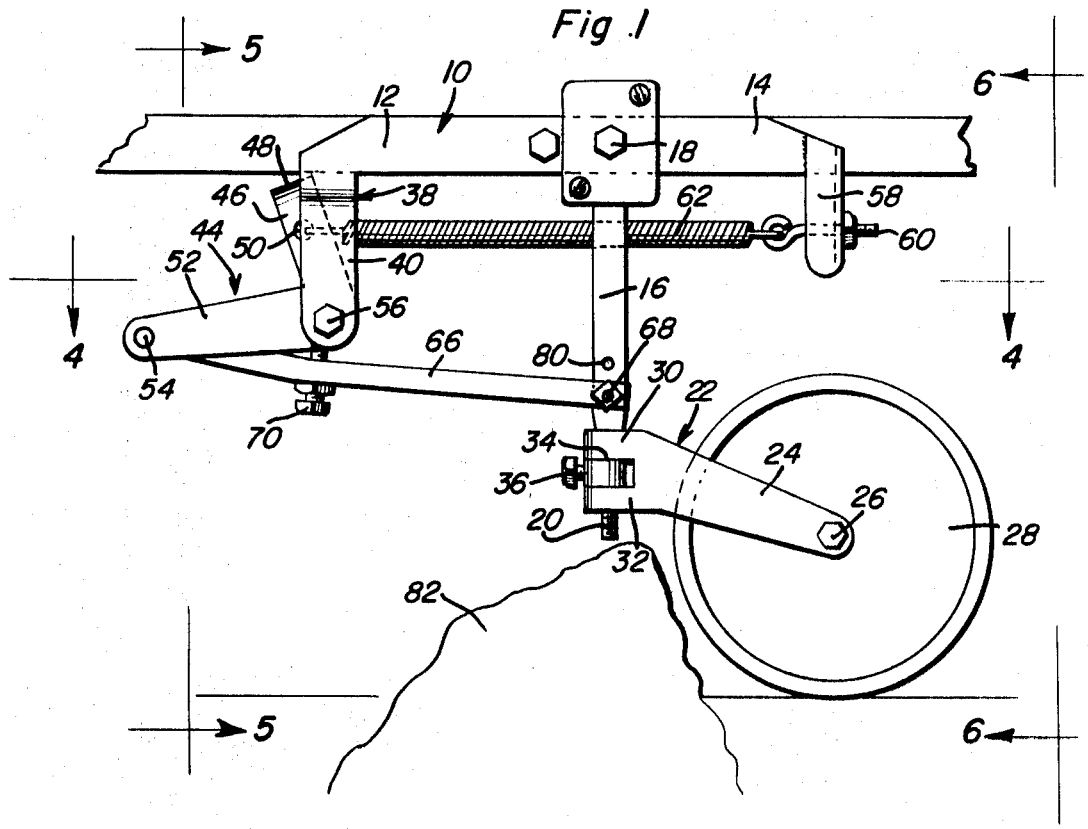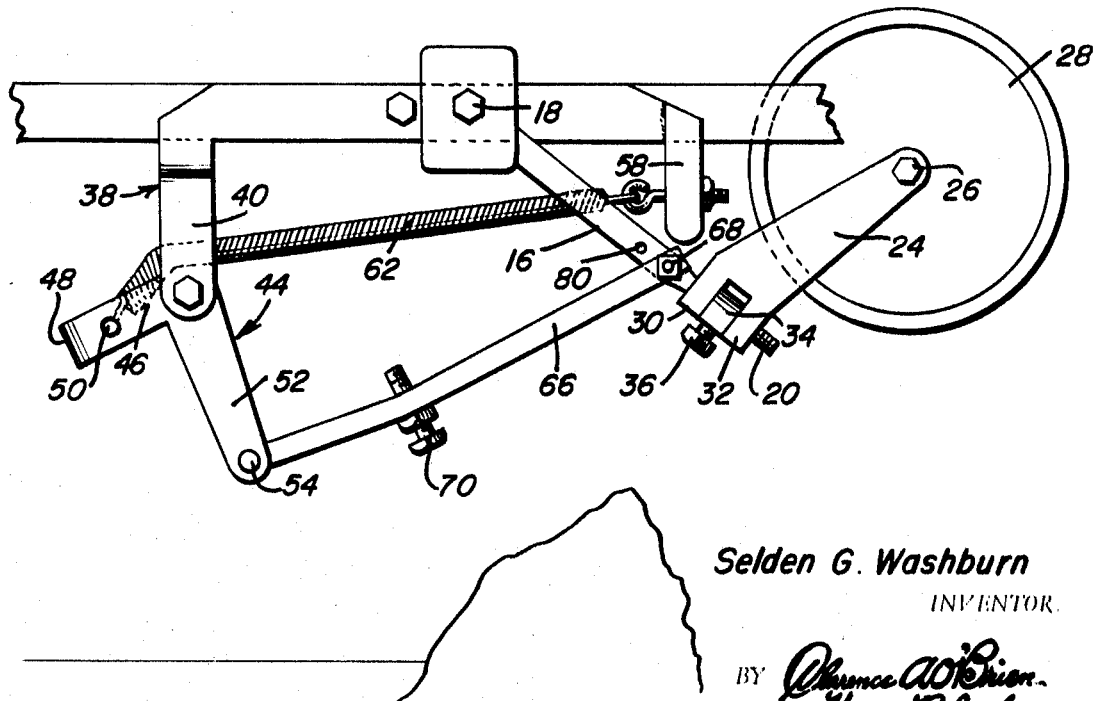

Selden G. Washburn
INVENTOR.

PLOW COULTER AND RELEASE MECHANISM

This invention relates generally to an implement structure which is operable to automatically, rearwardly and upwardly displace a tillage tool supported therefrom in response to the tillage tool encountering an obstruction with sufficient resistance to passage of the tillage tool therepast greatly increasing the possibility of breakage of the tillage tool unless it is released and withdrawn from the ground.

When utilizing tractor-drawn tillage tools, one of the hazards of the tillage operation is that an unexpected obstruction, such as a hidden rock or tree stump, may be encountered by the tillage tool. Impact of the tillage tool with the obstruction and the continued forward movement of the associated tractor invariably results in breakage of the tillage tool if the obstruction has sufficient resistance to the movement of the tillage tool therepast.

Accordingly, some implement constructions are provided with spring controlled tillage tool support arms which, when an obstruction is encountered by one of the tillage tools, is operable to swing the tillage tool encountering an unobstruction upwardly and rearwardly clear of the ground to prevent breakage of that tillage tool and allow continued forward movement of the implement being used.

While implements of this type including means for automatically releasing tillage tools from their operative positions have been known heretofore, most are not capable of lifting the tillage implement sufficiently high enough to clear a large obstruction. In addition, previously developed automatic releasing tillage tool support arms have been constructed whereby the yieldable resistance provided for opposing movement of the tillage tool to the released position increases continuously as the tillage tool is swung to the released position.

It is accordingly the main object of this invention to provide a tillage tool release structure which will be operative to lift an associated tillage tool, when released, sufficiently clear of the ground to clear large obstructions and in a manner whereby the yieldable resistance to movement of the tillage tool to its raised and released position will diminish as the tillage tool is swung from the fully operative position to the raised inoperative position.

Still another object of this invention is to provide an automatic tillage tool release structure in accordance with the preceding object and constructed in a manner whereby each individual tillage tool of a gang implement may be mounted in accordance with the present invention.

A final object of this invention to be specifically enumerated herein is to provide a device in accordance with the preceding objects which will conform to conventional forms of manufacture, be of simple construction and easy to use and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a side elevational view of an assemblage constructed in accordance with the present invention whereby a cultivator disc is supported from the frame portion of a draft implement in accordance with the present invention;

FIG. 2 is a side elevational view similar to FIG. 1 but with the cultivator disc in a raised release position;

Figure 3:
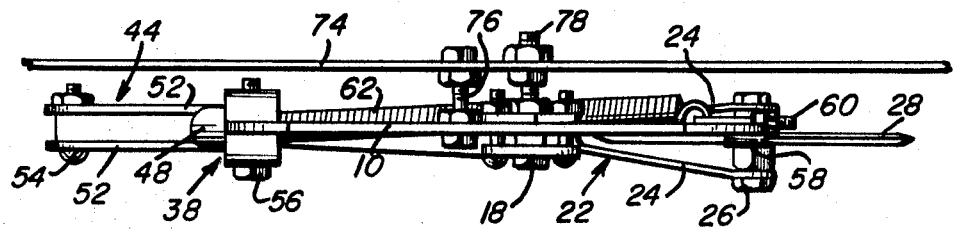
FIG. 3 is a top plan view of the assemblage illustrated in FIG. 1.
Figure 4:
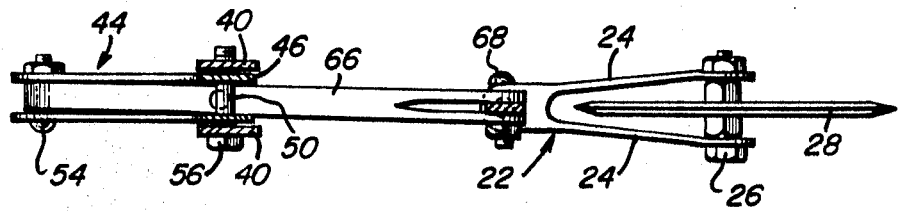
FIG. 4 is a horizontal sectional view of the assemblage illustrated in FIG. 1 taken substantially upon the plan indicated by the section line 4—4 of FIG. 1.
Figure 5:
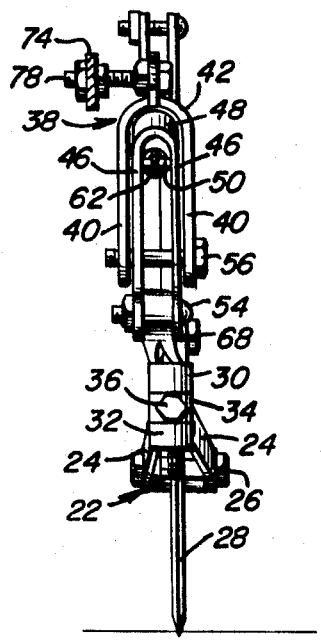
FIG. 5 is a vertical sectional view taken substantially upon a plane indicated by the section line 5—5 of FIG. 1.
Figure 6:
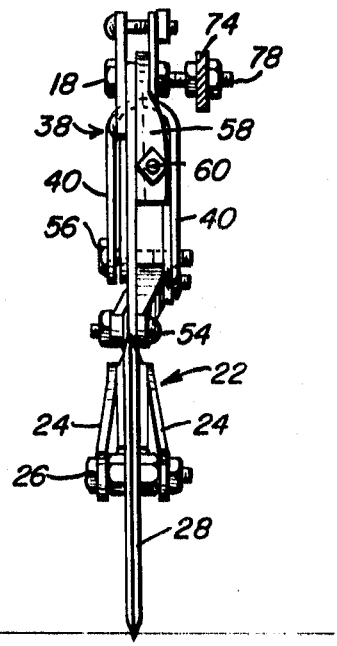
FIG. 6 is a vertical sectional view taken substantially upon the plane indicated by section line 6—6 of FIG. 1.

Referring now more specifically to the drawings the numeral 10 generally designates an elevated implement support frame portion including a front end 12 and a rear end 14. An elongated upstanding implement support arm 16 is provided and has its upper end pivotally supported from the frame portion 10 by means of a pivot fastener 18 and includes a lower end portion which projects below the frame portion 10. The lower end of the support 16 terminates downwardly in a threaded shank portion 20 and a second rearwardly and downwardly inclined support arm generally referred to by the reference numeral 22 is oscillatably supported at its forward end from the threaded shank portion 20. The support arm 22 includes a pair of rearwardly and downwardly inclined generally parallel arm elements between whose rear ends an axle shaft 26 having a coulter disc 28 journaled thereon is secured. The forward ends of the arm elements 24 are interconnected by means of a pair of vertically spaced and aligned sleeve portions 30 and 32 and a threaded abutment sleeve member 34 is threaded on the shank portion 20 between the sleeve portions 30 and 32 and includes a setscrew 36 by which the abutment sleeve member 34 is locked in position on the shank portion 20. Accordingly, it may be seen that the support arm 22 is oscillatable about the shank portion 20.

The front end 12 of the frame portion 10 includes an inverted U-shaped support member referred to in general by the reference numeral 38 defining a pair of upstanding opposite side legs 40 interconnected and their upper ends by means of a bight portion 42 secured to the frame portion 10. A bellcrank referred to in general by the reference numeral 44 is provided an includes a first pair of arms 46 having one pair of corresponding ends connected by a bight portion 48. An anchor pin 50 is secured between the arms 46 intermediate their opposite ends and the ends of the arms 46 remote from the bight portion 48 terminate in laterally directed parallel arms 52 whose free ends have an anchor pin 54 secured therebetween. Each pair of corresponding arms 46 and 52 are integrally formed and a pivot shaft 56 is secured through the lower ends of the arms or legs 40 and the junctures between each pair of corresponding arms 46 and 52 whereby the bellcrank 44 is oscillatably supported between the lower ends of the arms 40 of the support member 38.

An upstanding angle iron 58 is provided and has its upper end secured to the rear end 14 of the frame portion 10. The lower end of the angle iron 58 projects downwardly below the frame portion 10 and has an anchor fastener 60 secured therethrough. An expansion spring 62 has one end secured to the anchor pin 50 and the other end secured to the anchor fastener 60.

A connecting rod 66 has one end pivotally supported from the anchor pin 54 and the other end oscillatably secured to the lower end of the support arm 16 above the support arm 22 by means of a pivot fastener 68. In addition, the connecting rod 66 has an abutment fastener 70 adjustably secured therethrough and the upper end of the abutment fastener 70 is engageable with the lid portion of the pivot shaft 56 to limit angular displacement of the bellcrank 44 in a clockwise direction as viewed in FIG. 1 of the drawings.

The frame portion 10 is supported from an implement support beam 74 which may be towed behind any suitable drive implement (not shown) and any suitable means such as support fasteners 76 may be utilized to support the frame portion 10 from the support beam 74.

It is to be understood that the support arm 22 and coulter disc 28 could readily be replaced by a cultivator shovel removably stationarily supported from the shank portion 20. In addition, the support arm 16 is provided with an additional aperture 80 through which the fastener or pivot shaft 68 may be secured, if desired, in order to enable further adjustment of the release mechanism comprising the even numbered components 38—70. Of course, the anchor fastener 60 is also adjustable whereby the tension of the spring 62 may be adjusted and the pivot fastener 18 may be supported from the frame portion 12 in a manner such that it may be shifted longitudinally of the latter.

In operation, the support 16 is in its operative position when positioned as illustrated in FIG. 1 of the drawings. Should the coulter disc 28, during forward movement of the frame portion 10 (to the left as viewed in FIG. 1) strike a rock or other obstruction such as that indicated by the reference numeral 82 the resistance to forward movement of the coulter disc 28 represented by the rod 82 will increase the force acting upon the lower end of the support arm 16 to pivot it rearward toward the position thereof illustrated in FIG. 2 of the drawings. When this increased force reaches a predetermined amount, the bell crank 44 will be rotated in a clockwise direction as viewed in FIG. 1 of the drawings against the biasing action of the spring 62 toward the position of the bellcrank 44 illustrated in FIG. 2 of the drawings which, through the connecting rod 66, will swing the support arm 16 to the position thereof illustrated in FIG. 2 of the drawings. As a comparison of FIGS. 1 and 2 will show, the coulter disc 28 is swung rearwardly and upwardly as the support arm 16 is swung to its rearwardmost release position and thus the coulter disc 28 is lifted above the rock or obstruction 82 to clear the latter. As soon as the obstruction 82 has been passed, gravitational forces as well as the biasing action of the spring 62 will return the support arm to its operative position and it will be noted that the moment arm through which the spring 62 acts upon the bellcrank 44 is increased as the bellcrank 44 is swung to the rest position thereof illustrated in FIG. 1. In addition, the moment arm through which the connecting rod 66 acts upon the bellcrank 44 diminishes in length as the bellcrank 44 is swung to the rest position illustrated in FIG. 1 of the drawings. Accordingly, initial resistance to rearward swinging movement of the lower end of the support arm 16 is considerably greater than the resisting rearward swinging movement of the lower end of the support arm 16 after the support arm 16 has been at least slightly rearwardly displaced at its lower end from its rest or operative position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In combination, an elevated support frame portion having front and rear ends, an upstanding support arm pivotally supported adjacent its upper end from said frame portion for oscillation about a first horizontal transverse axis between a first upright operative position and a second implement release position with the lower end of said arm swung rearwardly and upwardly from said operative position, the lower end of said support arm being adapted to support an earth working implement therefrom, a bellcrank pivotally supported from said frame portion about a second horizontal transverse axis spaced forward of said first axis, said bellcrank including a first lower forwardly projecting arm and a second upwardly projecting arm, a front to rear extending rod connecting pivotally secured at its front end to the free end of said first arm and at its rear end to said support arm below said first axis, said connecting rod passing beneath said second axis, and a front to rear extending elongated expansion spring having its front end connected to the free end of said second arm and its rear end anchored to said frame portion rearward of said second axis.

2. The combination of claim 1 wherein the effective length of said first arm is less than the effective length of said support arm from said first axis to the point of attachment of the rear end of said connecting rod to said support arm.

3. The combination of claim 1 wherein said bellcrank is pivotally supported from said frame portion by means of a pivot fastener including a portion over which said expansion spring passes and about which said expansion spring is deflected upon swinging of said bellcrank to a position with said first arm in a downwardly directed position in response to rearward and upward swinging of the lower end portion of said support arm.

4. The combination of claim 3 wherein said connecting rod includes vertically adjustable abutment means engageable with said pivot fastener to limit upward swinging movement of the front end of said connecting rod, said connecting rod and support arm including means for vertically shifting the pivotal connection of said connecting rod to said support arm along the latter.